US008989295B2

(12) United States Patent
Skov et al.

(10) Patent No.: US 8,989,295 B2
(45) Date of Patent: Mar. 24, 2015

(54) MULTI-LAYER BEAMFORMING WITH PARTIAL CHANNEL STATE INFORMATION

(75) Inventors: Peter Skov, Beijing (CN); Lilei Wang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 8 days.

(21) Appl. No.: 13/988,524

(22) PCT Filed: Nov. 22, 2010

(86) PCT No.: PCT/CN2010/078954
§ 371 (c)(1),
(2), (4) Date: May 21, 2013

(87) PCT Pub. No.: WO2012/068716
PCT Pub. Date: May 31, 2012

(65) Prior Publication Data
US 2013/0243110 A1  Sep. 19, 2013

(51) Int. Cl.
| | |
|---|---|
| H04B 7/02 | (2006.01) |
| H04L 1/02 | (2006.01) |
| H04B 7/04 | (2006.01) |
| H04B 7/06 | (2006.01) |
| H04L 5/00 | (2006.01) |

(52) U.S. Cl.
CPC ............ *H04B 7/0408* (2013.01); *H04B 7/0486* (2013.01); *H04B 7/0469* (2013.01); *H04B 7/0691* (2013.01); *H04L 5/0023* (2013.01)
USPC ............................. 375/267; 375/259; 375/260

(58) Field of Classification Search
USPC ....................................................... 375/267
See application file for complete search history.

(56) References Cited

U.S. PATENT DOCUMENTS

| | | | | |
|---|---|---|---|---|
| 2010/0020891 | A1 | 1/2010 | Takano | 375/260 |
| 2011/0142166 | A1* | 6/2011 | Kim et al. | 375/296 |
| 2011/0261894 | A1 | 10/2011 | Yu et al. | |

(Continued)

FOREIGN PATENT DOCUMENTS

| | | |
|---|---|---|
| CN | 101755392 A | 6/2010 |
| JP | 2013521734 A | 6/2013 |

(Continued)

OTHER PUBLICATIONS

3GPP TSG RAN WG1 Meeting #57bis, Los Angeles, CA, USA, Jun. 29-Jul. 3, 2009, R1-092839, "Dual-Layer BF Remaining Issues", ZTE, 3 pgs.

(Continued)

*Primary Examiner* — Erin File
(74) *Attorney, Agent, or Firm* — Harrington & Smith

(57) ABSTRACT

A method of determining precoding information for beamforming between a sender and a receiver the method includes determining a first precoding vector of a first signal layer based on partial channel state information of a channel between the sender and the receiver. The method also includes determining a first guess vector based on long-term characteristics of the channel between the sender and the receiver. A grouping of antennas of the sender is defined and a phase shift value for each group of antennas is specified. The method further includes determining a second precoding vector in the sender of a second signal layer by multiplying each element in the first guess vector with the phase shift value specified for the group of antennas associated with said element in the first guess vector.

21 Claims, 7 Drawing Sheets

(56) References Cited

U.S. PATENT DOCUMENTS

2011/0274200 A1* 11/2011 Lee et al. .................. 375/295
2012/0082248 A1* 4/2012 Han et al. .................. 375/259
2013/0064317 A1 3/2013 Tong et al.

FOREIGN PATENT DOCUMENTS

| WO | WO 2008/097035 A1 | 8/2008 |
|---|---|---|
| WO | WO 2009/102163 A1 | 8/2009 |
| WO | WO 2010/061302 A2 | 6/2010 |
| WO | WO 2010/079748 A1 | 7/2010 |

OTHER PUBLICATIONS

3GPP TSG RAN WG1 Meeting #57bis, Los Angeles, CA, USA Jun. 29-Jul. 3, 2009, R1-092848, "Dual layer beamforming based on partial channel information", CATT, ZTE, Potevio, 6 pgs.

3GPP TSG RAN WG1 Meeting #58, Shenzhen, China, Aug. 24-28, 2009,R1-093515, "Single User beamforming based on partial channel information", CATT, 7 pgs.

3GPP TSG RAN WG1 #57bis, Jun. 29-Jul. 3, 2009, Los Angeles, R1-092631, "On UE Single Transmit antenna Sounding for LTE Rel-9 Enhanced DL Transmission", Motorola, 9 pgs.

Toufik et al., "MIMO-OFDAM Opportunistic Beamforming with Partial channel State Information", Communications, 2006, ICC '06, IEEE International Conference, abstract only.

Ozdemir et al., "Opportunistic Beamforming over Rayleigh Channels with Partial Side Information", Wireless Communications, IEEE Transactions, abstract only, IEEE Transactions on Wireless Communications, vol. 7, No. 9, Sep. 2008.

Ozdemir et al., "Opportunistic Beamforming with Partial Channel State Information", Communications, 2006, ICC '06, IEEE International Conference, abstract only.

Mitsubishi Electric; "Performance Evaluation of Rank-1 Precoded SRS"; R1-093150; 3GPP TSG RAN WG1 #58 meeting; Shenzhen, China; Aug. 24-28, 2009; whole document (10 pages).

CATT; "Study on channel reciprocity in LTE-A"; R1-093542; 3GPP TSG RAN WG1 Meeting #58; Shenzhen, China; Aug. 24-28, 2009; whole document (7 pages).

CATT; "Considerations on feedback mechanisms for Dual-Layer Beamforming in TDD"; R1-094124; 3GPP TSG RAN WG1 Meeting #58 Bis; Miyazaki, Japan; Oct. 12-16, 2009; whole document (4 pages).

L. Wang, et al.; "Dual Layer Beamforming with Reduced Channel State Information in TD-LTE System"; IEEE; 8th International Conference on Wireless Communications, Networking and Mobile Computing (WiCOM); Shanghai, China; Sep. 21-23, 2013; whole document (4 pages).

* cited by examiner

MULTI-LAYER BEAMFORMING WITH PARTIAL CHANNEL STATE INFORMATION

FIELD OF THE INVENTION

The invention relates to beamforming and in particular multi-layer beamforming with partial channel state information.

BACKGROUND OF THE INVENTION

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless fink.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

One aspect of LTE-Advanced Release 9 is that dual layer beamforming can be provided with a plurality of antennas which have a low correlation between different polarizations. Under typical radio channel conditions there can be at least two strong multiple input and multiple output (MIMO) sub channels with the plurality of antennas. In this way, a dual stream transmission can be achieved and improve cell throughput compared to a single layer beamforming transmission. The dual layer beamforming in 3GPP LTE release 9 can combine user equipment (UE) specific beamforming and spatial multiplexing. UE specific beamforming can be useful for time division duplex (TDD) systems as this arrangement can provide uplink and downlink channel reciprocity, which can be used to obtain instantaneous radio channel state information in order to generate near optimal precoding.

The radio channel state information can be obtain through measurements of channel state reference signals, such as sounding reference signals (SRS), which can be transmitted from the user equipment. The measurements of the channel state reference signals can be made such that each individual path between a transmit antenna and a receiver antenna can be measured.

In LTE there are agreements to leave the decision of supporting transmission of sounding reference signals (SRS) from all transmitting antennas up to the discretion of the user equipment manufacturers. In practice this means that a user equipment with, for example, two antennas can receive with two antennas but can only transmit with one antenna. This means that there may be no possibility for a base station to measure the full downlink channel state based on uplink channel transmission of sounding reference signals from a user equipment. This means that there may be only partial channel state information and this can impact the performance of dual-layer beamforming transmissions.

One proposal is to use dual layer beamforming with information based on the partial channel state information. R1-093515 3GPP TSG RAN WG1 #58 and R1-092631 3GPP TSG RAN WG1 #57bis suggest providing channel state information for the second layer based on second weighting vector mapping of a second largest eigenvalue (of channel state information). This can be obtained using a frequency granularity such as six physical resource blocks with a single antenna transmitting sounding reference signals. This only considers orthogonality between a first layer beamformer and a second layer beamformer and can lead to sub-optimal beamformers being used.

Other suggestions in Ozdemir et al "Opportunistic Beamforming with Partial Channel State Information" ICC June 2006 pp 5313-5318, Ozdemir et al "Opportunistic Beamforming over Rayleigh Channels with Partial Side Information" IEEE Trans. On Wireless Communication vol. 7 no. 9 pp 3416-3427 September 2008, and Toufik et al "MIMO OFDMA Opportunistic Beam forming with Partial Channel State Information" ICC 2006 pp 5389-5394 provide different arrangements of scheduling or feedback mechanisms for addressing partial channel state information.

It is noted that the above discussed issues are not limited to any particular communication environment, but may occur in any appropriate communication system where muting of data transmissions may be provided.

STATEMENT OF INVENTION

Embodiments of the invention aim to address one or several of the above issues.

In accordance with an embodiment there is provided a method of determining precoding information for beamforming between a sender and a receiver the method comprising: determining a first precoding vector of a first signal layer based on partial channel state information of a channel between the sender and the receiver; determining a first guess vector based on long-term characteristics of the channel between the sender and the receiver; defining a grouping of antennas of the sender; specifying a phase shift value for each group of antennas; and determining a second precoding vector in the sender of a second signal layer by multiplying each element in the first guess vector with the phase shift value specified for the group of antennas associated with said element in the first guess vector.

In accordance with a more detailed embodiment, preferably determining the first precoding vector comprises determining a first eigenvector of a channel covariance matrix and using the first eigenvector in the sender as the first precoding vector of the first signal layer.

Preferably the method comprises determining the first guess vector by one of: determining a steering vector based on a determined angle of arrival of signals from the receiver; and determining a second eigenvector of a channel covariance matrix based on the long-term characteristics of the channel between the sender and the receiver.

Preferably one or more groups of antennas is defined. Preferably the phase shift value is specified for one or more group of antennas. Preferably the determining of the second precoding vector in the sender of a second signal layer is based on one or more elements in the first guess vector with the phase shift value specified for one or more group of antennas.

Preferably the grouping of antennas is based on the correlation between the antennas and wherein substantially correlated antennas are assigned to the same group. Preferably the grouping of antennas is based on at least one of: spacing between the antennas; and polarization configuration of the antennas.

Preferably the method comprises determining the phase shift values of said groups of antennas to minimize an inner product of the first and second precoding vectors. Preferably the phase shift values are selected within a predefined set of phase shift values.

Preferably the method comprises determining a component of the second precoding vector which is orthogonal to the first precoding vector and using the component as the second precoding vector of said second signal layer. Preferably the same phase shift value is used for all groups of antennas. Preferably wherein the phase shift value is $e^{j\Phi}=1$.

In accordance with yet another embodiment there is provided a control apparatus for determining precoding information for beamforming between a sender and a receiver comprising: a processor being configured to: determine a first precoding vector of a first signal layer based on partial channel state information for a channel between the sender and the receiver; determine a first guess vector based on long-term characteristics of the channel between the sender and the receiver; define a grouping of antennas of the sender; specify a phase shift value for each group of antennas; and determine a second precoding vector by multiplying each element in the first guess vector with the phase shift value specified for the group of antennas associated with said element in the first guess vector.

In accordance with yet another embodiment there is provided a control apparatus comprising means for determining precoding information for beamforming between a sender and a receiver comprising: determining means for determining a first precoding vector of a first signal layer based on partial channel state information for a channel between the sender and the receiver; determining means for determining a first guess vector based on long-term characteristics of the channel between the sender and the receiver; defining means for defining a grouping of antennas of the sender; specifying means for specifying a phase shift value for each group of antennas; and determining means for determining a second precoding vector by multiplying each element in the first guess vector with the phase shift value specified for the group of antennas associated with said element in the first guess vector.

In accordance with yet another embodiment there is provided use of a first precoding vector in a sender for precoding data of a first signal layer and a second precoding vector in the sender for precoding data of a second signal layer.

A computer program comprising program code means adapted to perform the method may also be provided.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION

Figure 1:
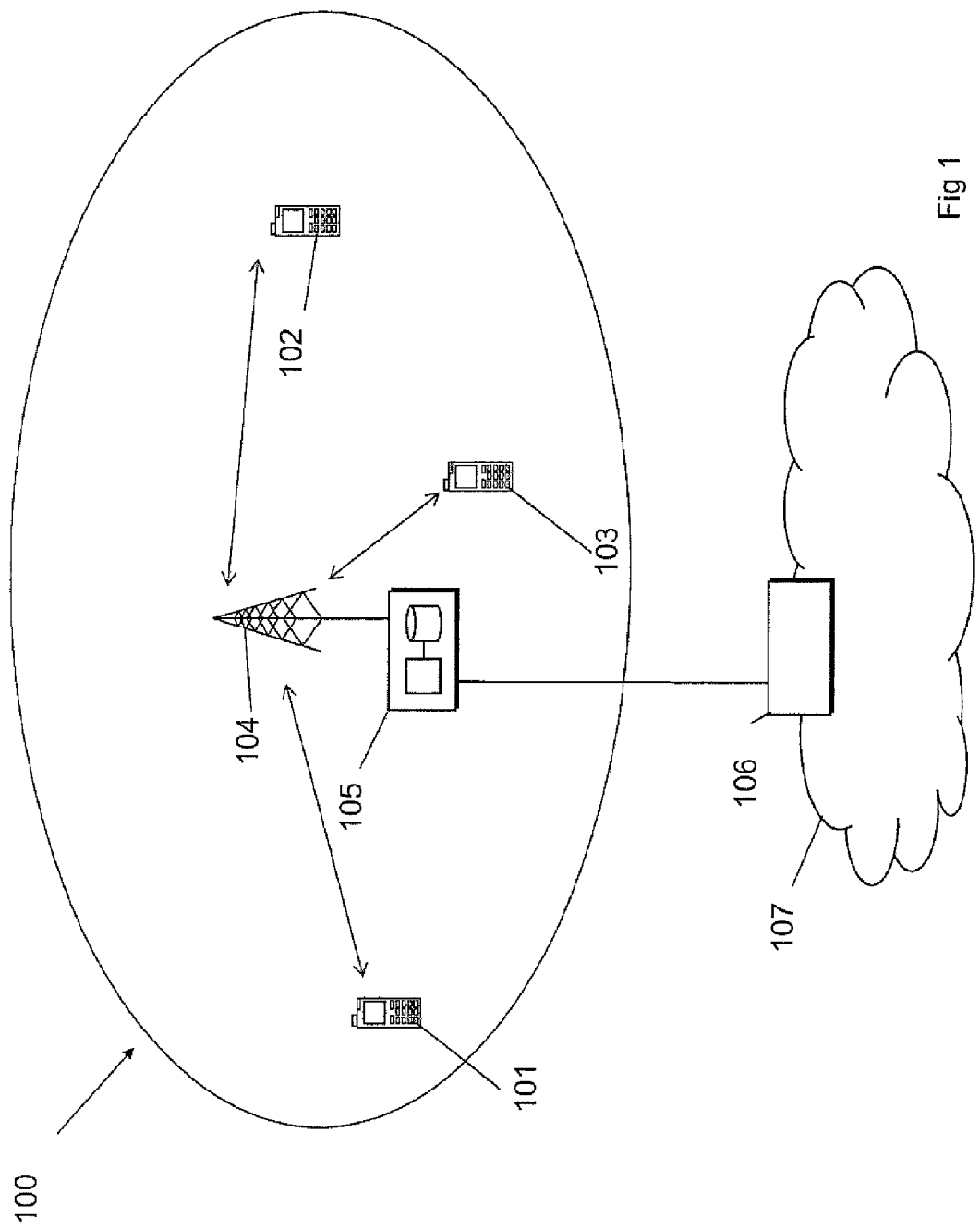
FIG. 1 shows a schematic diagram of a network according to some embodiments.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A mobile communication device or user equipment 101, 102, 103 is typically provided wireless access via at least one base station or similar wireless transmitter and/or receiver node of an access system.

However, it is noted that instead of one access systems, any number of access systems can be provided in a communication system. An access system can be provided by a cell of a cellular system or another system enabling a communication device to access a communication system. A base station site 104 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, and base station 104 may have one or more radio channels open at the same time and may send signals to and/or receive signals from more than one source.

Base station 104 is typically controlled by at least one appropriate controller apparatus 105 so as to enable operation thereof and management of mobile communication devices 101, 102, 103 in communication with the base station 104. The control apparatus 105 can be interconnected with other control entities. The control apparatus 105 can typically provided with memory capacity 301 and at least one data processor 302. The control apparatus 105 and functions may be distributed between a plurality of control units.

The cell borders or edges are schematically shown for illustration purposes only in FIG. 1. It shall be understood that the sizes and shapes of the cells or other radio service areas may vary considerably from the similarly sized omni-directional shapes of FIG. 1.

In particular, FIG. 1 depicts a wide area base station 106, which can be an enhanced node B (eNB) 104. The eNB 104 transmits and receives data over the entire coverage of the cell 100.

The mobile communication devices 101, 102, 103 can access the communication system 100 based on various access techniques, such as code division multiple access (CDMA), CDMA 2000 or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication systems is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base station 104 of the access systems can be connected to a wider communications network 107. A controller apparatus 105 may be provided for coordinating the operation of the access systems. A gateway function 106 may also be provided to connect to another network via the network 107. The base station 104 can be connected to other base stations (not shown) by a communication link for sending and receiving data. The communication link can be any suitable means for sending and receiving data between the base stations and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
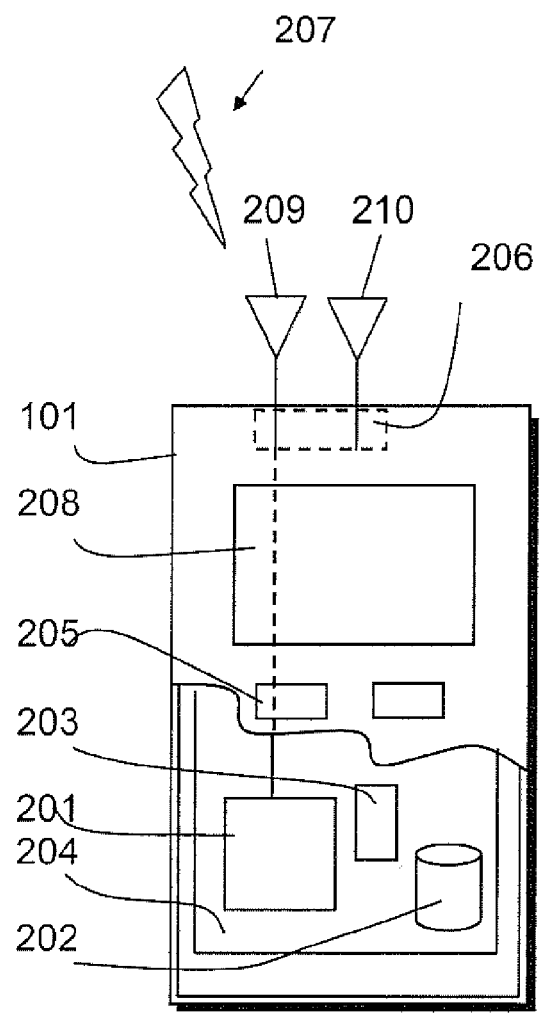
FIG. 2 shows a schematic diagram of a mobile communication device according to some embodiments.

The mobile communication devices will now be described in more detail in reference to FIG. 2. FIG. 2 shows a schematic, partially sectioned view of a communication device 101 that a user can use for communication. Such a mobile communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The user equipment 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The user equipment 101 can be provided with a Multiple Input/Multiple Output (MIMO) antenna system. MIMO arrangements as such are known. MIMO systems use multiple antennas at the transmitter and receiver along with advanced digital signal processing to improve link quality and capacity. Indeed, as shown in FIG. 2, the user equipment can have a plurality of antennas 209, 210. The base station 104 can also comprise a plurality of antennas (not shown). Furthermore the base station 104 and the user equipment 101 can provide a plurality of antenna ports. More data can be received and/or sent where there are more antennae elements. A station may comprise an array of multiple antennae. Reference signalling and muting patterns can be associated with Tx antenna numbers or port numbers of MIMO arrangements. In some embodiments the user equipment 101 and the base station 104 can communicate over a plurality of layers of one or more channels. For example the user equipment 101 and the base station 104 can establish dual layer beamforming on two layers of a channel.

The user equipment 101 is also typically provided with at least one data processing entity 201, at least one memory 202 and other possible components 203 for use in software and hardware aided execution of tasks it is designed to perform, including control of access to and communications with access systems and other user equipment. The data processing, storage and other relevant control apparatus can be provided on an appropriate circuit board and/or in chipsets. This feature is denoted by reference 204. Possible control functions in view of configuring the mobile communication device for reception and processing of information in association with transmission patterns and for muting signals by means of the data processing facility in accordance with certain embodiments of the present invention will be described later in this description.

The user may control the operation of the user equipment by means of a suitable user interface such as key pad 205, voice commands, touch sensitive screen or pad, combinations thereof or the like. A display 208, a speaker and a microphone can be also provided. Furthermore, a user equipment may comprise appropriate connectors (either wired or wireless) to other devices and/or for connecting external accessories, for example hands-free equipment, thereto.

Figure 3:
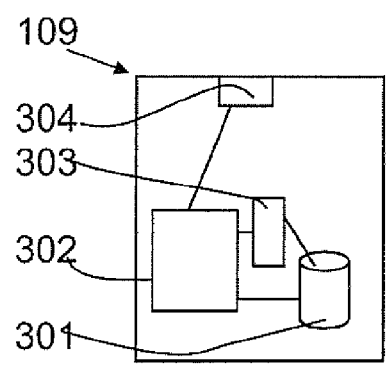
FIG. 3 shows a schematic diagram of a control apparatus according to some embodiments.

FIG. 3 shows an example of a control apparatus 105 for a communication system, for example to be coupled to and/or for controlling a station of an access system. In some embodiments the base station 104 comprises a separate control apparatus 105. In other embodiments the control apparatus 105 can be another network element. The control apparatus 105 can be arranged to provide control of communications by user equipment that are in the service area of the system. The control apparatus 105 can be configured to provide control functions in association with generation and communication of transmission patterns and other related information and for muting signals by means of the data processing facility in accordance with certain embodiments described below. For this purpose the control apparatus 105 comprises at least one memory 301, at least one data processing unit 302, 303 and an input/output interface 304. Via the interface the control apparatus can be coupled to a receiver and a transmitter of the base station 104. The control apparatus 105 can be configured to execute an appropriate software code to provide the control functions.

The required data processing apparatus and functions of a base station apparatus, a user equipment and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Figure 4:
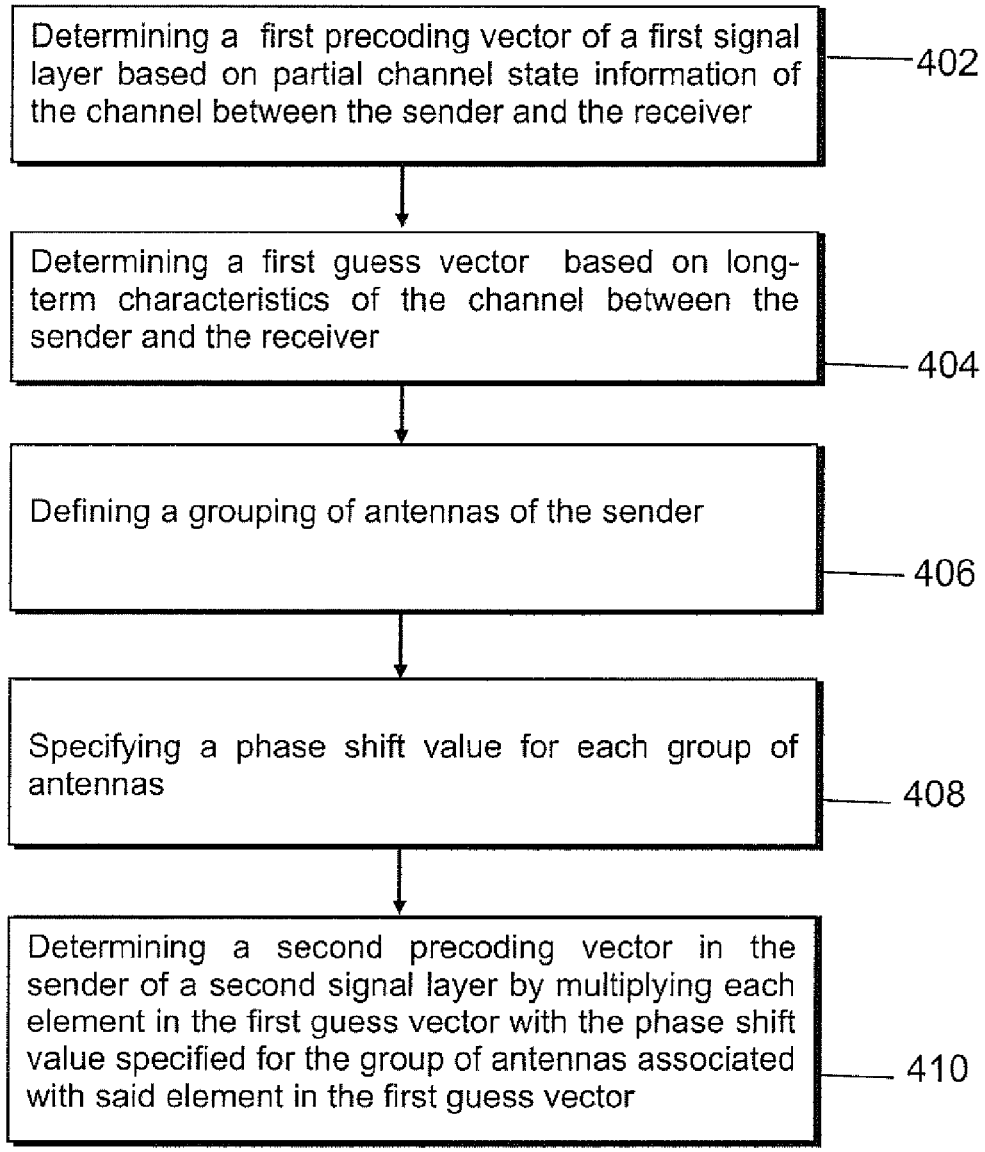
FIG. 4 shows a schematic flow diagram according to some embodiments.

Some embodiments will now be described with reference to FIG. 4. FIG. 4 illustrates a schematic flow diagram of a method of some embodiments. The processor 302 can initiate deriving the information for dual layer beamforming between the base station 104 and the user equipment 101. In some embodiments the processor 302 initiates deriving the information for multi-layer or, for example, dual layer beamforming when the user equipment starts communication with the base station 104. In other embodiments the processor 302 initiates deriving the information for dual layer beamforming whilst the user equipment 101 is communicating with the base station 104. The processor 302 can determine to initiate deriving the information for dual layer beamforming in response to an event, such as determining dual layer beamforming capability of the user equipment 101.

After the processor 302 determines to initiate deriving the information for dual layer beamforming between the user equipment 101 and the base station 104, the processor 302 initiates determining a first precoding vector of a first signal layer as shown in block 402 of FIG. 4. In some embodiments the precoding vector or beamformer information is information used by the base station 104 and/or the user equipment 101 to initiate and provide beamforming therebetween.

In some embodiments the processor 302 receives radio measurements which allow the processor to derive partial channel state information of the channel between a sender and a receiver. The sender and receiver can be the base station 104 and the user equipment 101 respectively or vice versa. The processor 302 may derive from this partial channel state information a channel covariance matrix of the channel between the sender and the receiver. The processor may further derive from the radio measurements by means of averaging in time and frequency domain a second channel covariance matrix characterizing the long-term characteristics of the channel between the sender and the receiver. The processor may to this end employ modelling assumptions of the channel between the sender and the receiver. The measurements can be predetermined and stored in memory, or can alternatively be measured as part of determining the precoding information.

In some embodiments the processor 302 derives a first precoding vector of a first signal layer based on partial channel state information of the channel between the sender and the receiver as shown in block 402 of FIG. 4. In some embodiments any suitable means can be used to determine the first precoding vector of the first signal layer based on partial channel state information of the channel between the sender and the receiver. In some embodiments the processor determines the first precoding vector P1 using the main eigenvectors of the channel covariance matrix for precoding. In this way, the processor may generate an eigenvector $W_{EBB1}$ of the channel covariance matrix and may use $W_{EBB1}$ for beamforming in the sender as a first precoding vector P1 of a first signal layer. The processor 302 may also obtain another eigenvector $W_{EBB2}$ of the channel covariance matrix and may use $W_{EBB2}$ for beamforming in the sender as a second precoding vector P2 of a second signal layer. But the precoding vector $W_{EBB2}$ may not be sufficient to be used for dual layer beamforming and the processor 302 may determine an estimation vector or a first guess vector P for determining the second precoding vector of the second signal layer.

In some embodiments the first guess vector P is determined based on long-term characteristics of the channel between the sender and the receiver as shown in block 404 of FIG. 4. In some embodiments any means suitable can be used to determine the first guess vector based on long-term characteristics of the channel between the sender and the receiver. In some embodiments the first guess vector P may be determined based on a steering vector $W_{DoA}$ which is determined by the angle of arrival of signals received from the receiver at the sender.

In some embodiments the first guess vector P may be determined based on an eigenvector of the second covariance matrix based on the long-term characteristics of the channel between the sender and the receiver. The long term characteristics of the channel can comprise one or more of the following: channel direction, the steering vector, channel scattering information, and channel fading information and any other suitable information for describing the long-term characteristics of the channel.

In some embodiments the processor 302 may define a grouping of the antennas at the sender as shown in block 406 of FIG. 4. In some embodiments any means suitable can be used to define a grouping of the antennas at the sender. This grouping of the antennas may be based on information as to the correlation between the antennas, that is correlation of the signals transmitted from the various antennas. This grouping may in particular consider the spacing between the antennas and/or the polarization configuration of the antennas.

In some embodiments the processor 302 may specify a phase shift value $e_{j\phi}$ for each group of antennas as shown in block 408 of FIG. 4. In some embodiments any means suitable can be used to specify a phase shift value for each group of antennas. The processor 302 may determine the second precoding vector P2 of the second signal layer by multiplying each element in the first guess vector P with the phase shift value $e^{j\phi}$ for the group of antennas associated with said element in first guess vector P as shown in block 410 of FIG. 4. In some embodiments any means suitable can be used to determine the second precoding vector of the second signal layer by multiplying each element in the first guess vector with the phase shift value for the group of antennas associated with said element in first guess vector.

In some embodiments the processor 302 may use the steering vectors $W_{DoA}(g)$ of the antenna groups as the first guess vector P for the precoding vector of the second signal layer and may define the grouping of the antennas based on the polarization configuration of the antennas.

$$W_{DoA}(g) = (u_1(g), u_2(g), \ldots, u_i(g)) \quad (1)$$

wherein u is defined as:

$$u_i(g) = e^{\frac{-j \cdot 2 \cdot \pi \cdot (i-1) d}{\lambda} \sin\theta(g)} \quad (2)$$

and where i is the antenna number, j is the imaginary unit, $\theta(g)$ is the angle of the direction of arrival (DoA) of signals from the receiver (for instance a UE) at the antennas of group g, d is the antenna distance in the sender (for instance a base station) and $\lambda$ is the wavelength for an evaluated subcarrier or group of subcarriers. Each polarization group shares the same DoA weighting vector and each antenna in the same polarization group uses the weighting value based on equation (2). But the groups may have independent long-term characteristics which may lead to different angles $\theta(g)$ for the two groups of antennas. In this way the processor 302 determines the steering vector or DoA weighting vectors $W_{DoA}(g)$ for the two groups from the positions of, for instance, the UE 101 and the base station 104.

The processor 302 may replace the precoding vector $W_{EBB2}$ by a first guess vector P for the second precoding vector of the second signal layer based on $W_{DoA}$ and the polarization configuration of the antennas. In this way, the processor uses the long-term channel statistics as a basis for generating a new precoding vector P2 for the second signal layer. For instance, employing $I_A$ dual polarized antennas leads to a first guess vector P of length $2 I_A$ where the elements $1 \ldots I_A$ are associated with the first polarization direction of each antenna i and element $i + I_A$ is associated with the second polarization direction of antenna i.

$$P = [W_{DoA}(1) W_{DoA}(2)]^T \quad (3)$$

The processor 302 may define two groups of antennas or antenna elements $1 \ldots I_A$ and $I_A + 1 \ldots 2 I_A$ according to the polarization directions of the antenna elements.

Figure 5:
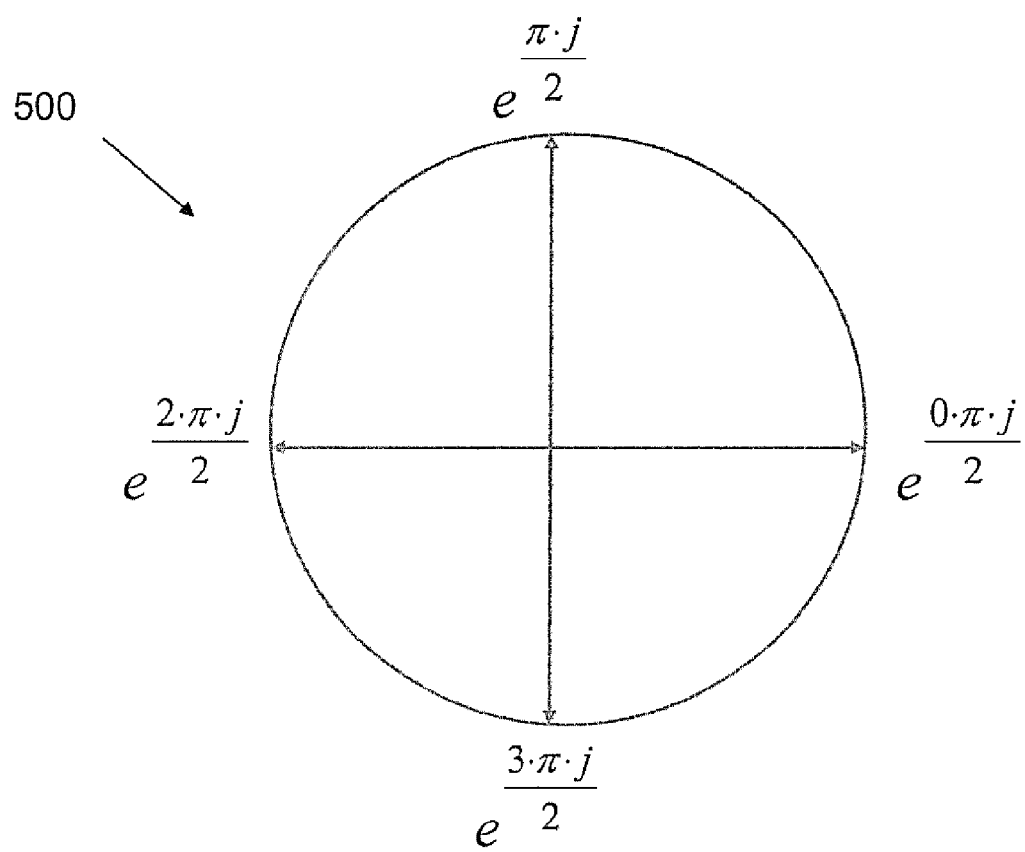
FIG. 5 shows an illustrative example of different possible phases.

The processor 302 may further define a set of phase shift values $\{e^{j\Phi}\}$. Referring to FIG. 5, the processor 302 determines that N, the total sample number of phase shift values is 4, which corresponds to the total number of possible phases of the second layer. FIG. 5 illustrates the set of phase shift values $\{e^{j\Phi}\}$ comprising the phase shift values $$e^{\frac{0 \cdot \pi \cdot j}{2}}, e^{\frac{\pi \cdot j}{2}}, e^{\frac{2 \cdot \pi \cdot j}{2}}, \text{ and } e^{\frac{3 \cdot \pi \cdot j}{2}}.$$

The processor 302 then searches the phase shift value for the second group of antennas in $W_{phase}$ such that an inner product of the first precoding vector and the second precoding vector <P1,P2> is minimized, wherein the second precoding vector P2 is obtained from the first guess vector P by element-wise multiplication of the elements in first guess vector P associated with the $2^{nd}$ group of antennas with the phase shift value $e^{j\Phi}$ selected for the $2^{nd}$ group of antennas.

For the first guess vector P according to (3) this element-wise multiplication is equivalent to the matrix multiplication in (6).

$$P_{Aux} = \begin{bmatrix} W_{DoA} & 0 \\ 0 & W_{DoA} \end{bmatrix} \quad (4)$$

$$W_{phase} = \frac{1}{\sqrt{2}} \begin{bmatrix} 1 & e^{\frac{2 \cdot \pi \cdot n \cdot j}{N}} \end{bmatrix}^T \quad (5)$$

$$P2 = P_{Aux} W_{phase} \quad (6)$$

In some other embodiments, the processor 302 calculates from the first guess vector P a precoding vector P2 for the second signal layer which is orthogonal to or substantially orthogonal to the precoding vector P1 of the first signal layer. The first guess vector P may be based on the steering vectors $W_{DoA}(g)$ for dual-polarized antennas which may lead to the first guess vector P in (3). The processor 302 may employ the Gram-Schmidt method for calculating precoding vector P2 from first guess vector P:

$$P2 = P2\_orth = P - \left[\frac{P \cdot P1}{|P1|^2}\right] \cdot P1 \quad (7)$$

Figure 6:
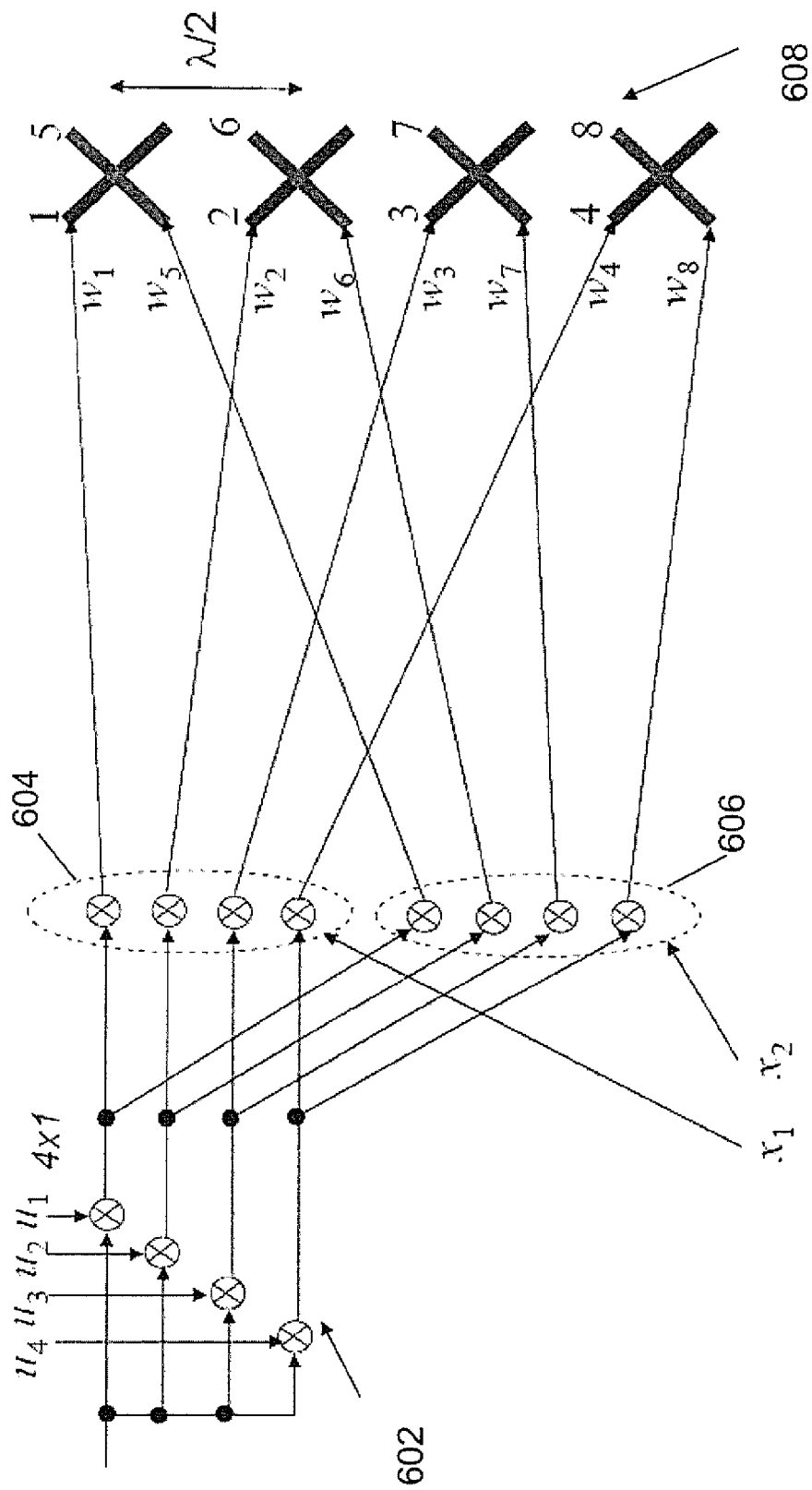
FIG. 6 shows a schematic representation of a sender according to some embodiments.

FIG. 6 illustrates a schematic representation of the beamformer for the second signal layer in a sender according to some embodiments. FIG. 6 illustrates an exemplary schematic representation of a sender performing the method according equations (1) to (6) for 4 dual-polarized antennas and $W_{DoA} = W_{DoA}(1) = W_{DoA}(2)$. The processor 302 determines the steering vector $W_{DoA}$ which comprises the elements 602 $u_1$, $u_2$, $u_3$, and $u_4$ defined in equation (2). The processor (302) determines the first guess vector P according equation (3) by providing the elements of $W_{DoA}(1)$ to the inputs of a first group of multipliers (604) and the elements of $W_{DoA}(2)$ to a second group of multipliers (606). The values $x_1$ and $x_2$ denote the phase shift values for the first and the second signal layer of $W_{phase}$ in (5). The element-wise multiplication by $x_1$ for the first group of antennas according equation (6) is performed in the first group of multipliers (604). The element-wise multiplication by $x_2$ for the second group of antennas according equation (6) is performed in the second group of multipliers (606). The resulting precoding vector $P2 = (w_1 \ldots w_8)^T$ is used for beamforming in dual-polarized antennas (608).

Table 1 below shows the parameters and assumptions used for simulating use of the determined precoding vector for the first and the second signal layers for data transmission between a sender and a receiver according to some embodiments.

| Parameter | Assumption |
| --- | --- |
| Cellular Layout | Hexagonal grid, 7 cell sites, 3 sectors per site |
| Inter-site distance | 500 m |
| Distance-dependent path loss | L = 128.1 + 37.6log10(•R), R in Kilometers |
| Lognormal Shadowing | Log Normal |
| Shadowing standard deviation | 8 dB |
| Correlation distance of Shadowing | 50 m |
| Shadowing correlation Between cells | 0.5 |
| Between sectors | 1 |
| Penetration Loss | 20 dB |
| Antenna pattern | 3D antenna |
| Antenna configuration | 8 × 2 Dual polarized, 0.5 lambda spacing in co-polar domain |
| Carrier Frequency/Bandwidth | 2.0 GHz |
| Channel model | Spatial Channel Modelling (SCM) |
| UE speeds of interest | 3 km/h |
| Total BS TX power (Ptotal) | 46 dBm – 10 MHz carrier |
| Minimum distance between UE and cell | >=35 meters |
| PS Algorithm | Proportional fair |
| Rank adaptation | Dynamic |
| Control channel | 3 OS (including some common reference signals) |
| Reference signal configuration | Common reference signals (CRS): Port 0 and 1 enabled Dedicated Reference signals (DRS): Port 7 and Port 8 enabled |
| UE Channel estimation | Ideal |
| Feedback signalling | Channel Quality indicator (CQI) reporting granularity is 6 PRB Reporting period is 10 ms and delay is 6 ms |
| Receiver algorithm | Ideal MMSE (Minimum Mean Square Error) |

Figure 7:
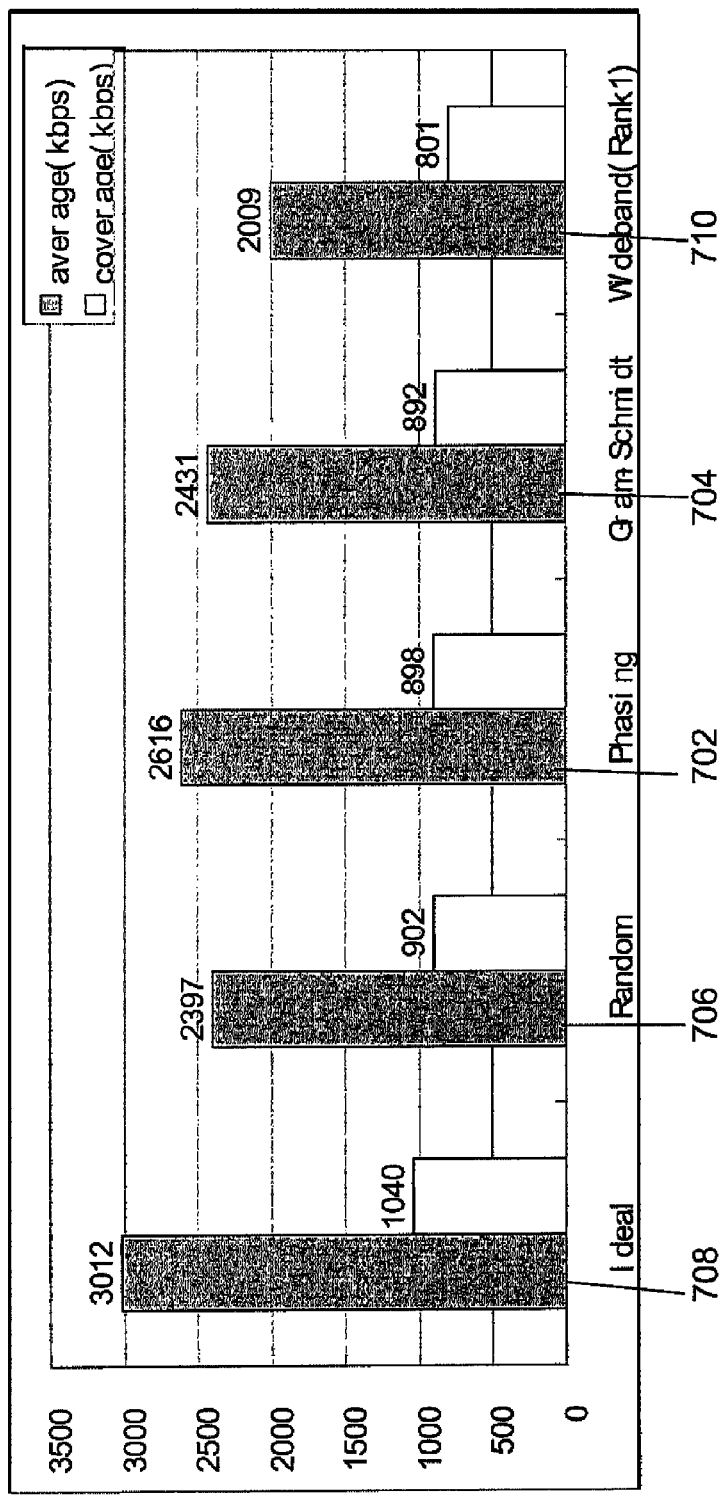
FIG. 7 shows a graph of simulated throughput according to some embodiments.
Figure 8:
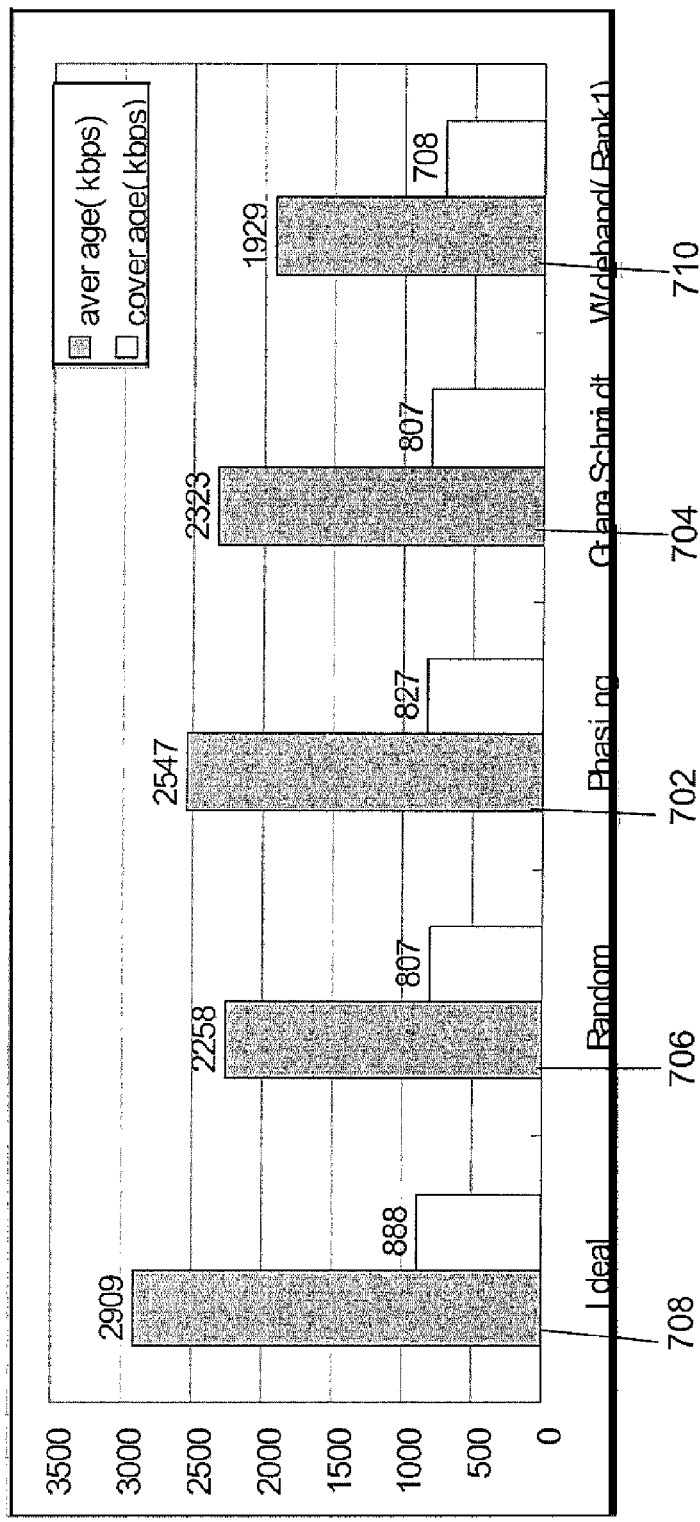
FIG. 8 shows another graph of simulated throughput according to some embodiments.

FIGS. 7 and 8 illustrate graphs of simulated throughput performance for different schemes in cases where the azimuth spread and 8 degrees and 15 degrees respectively. The reference numbers in FIGS. 7 and 8 are the same. The simulated throughput performance is based on the parameters and assumptions outlined in table 1.

The different methods are based on a single antenna sounding for the simulation except for the ideal data point 708. A sounding bandwidth of 4 physical resource blocks (PRB) and chancel estimation error has also been used for the simulation. The ideal data point 708 can be a throughput higher bound for the simulations.

Data point 704 represents throughput performance according to the embodiments for determining the precoding vector P2 using the Gram-Schmidt orthogonalizing method. Data point 702 represents the throughput performance of some embodiments using phase searching method for determining the precoding vector P2.

Data point 706, labelled "random" represents a method for estimating a second layer precoder which is generated by eigenvalue decomposition directly except for enlarging the precoding granularity. Data point 710, labelled "Wideband (Rank 1), represents a method which only supports a single layer transmission and obtains the weighting vector from eigenvalue decomposition of a long term channel covariance matrix. The wideband (Rank 1) data point can be a throughput lower bound for the simulations.

FIG. 7 shows that the data point 704 is a 1.4% improvement over the random method and the data point 702 is a 9.2% improvement over the random method. FIG. 8 shows that the data point 704 is a 2.9% improvement over the random method and the data point 702 is a 12.8% improvement over the random method.

Methods and embodiments have been set out for dual-layer beamforming and precoding vectors P1 and P2. But the person skilled in the art will appreciate that the calculation of a new precoding vector P2 according to some embodiments can be construed as one step of an iterative procedure.

In step 0 when the iterative procedure is started $P1(0)=(p_1, p_2, \ldots p_n)$ may comprise at least one eigenvector p of the covariance matrix of the channel between the sender and the receiver.

In each step k of the iterative procedure a new precoding vector P2 is calculated by setting $P1=P1(k)$ and $P1(k)$ is extended by forming $P1(k+1)=(P1(k), P2)$ for the next step of the iterative procedure.

The person skilled in the art will further appreciate that minimizing an inner product of the first precoding vector and the second precoding vector <P1,P2> for dual-layer beamforming can be construed in step k of the iterative procedure as minimizing the length of the projection of P2 in the space spanned by the vectors of $P1(k)$. The calculation of P2_orth according to equation (7) for dual-layer beamforming can be construed in step k of the iterative procedure as calculating the component of P which is orthogonal to the space spanned by the vectors of $P1(k)$.

The person skilled in the art will further appreciate that the number of signal layers between a sender and a receiver is preferably bound by the number of the groups of antennas which can be formed.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. Furthermore, the processes carried out by the processor 302 of the control apparatus can be carried out by another suitable processor. For example, another network element can carry out the processes or for example, a processor of the user equipment.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method of determining precoding information for beamforming between a sender and a receiver, comprising:
    determining a first precoding vector of a first signal layer based on partial channel state information of a channel between the sender and the receiver;
    determining a first guess vector based on long-term characteristics of the channel between the sender and the receiver;
    defining a grouping of antennas of the sender;
    specifying a phase shift value for each group of antennas; and
    determining a second precoding vector in the sender of a second signal layer by multiplying each element in the first guess vector with the phase shift value specified for the group of antennas associated with said element in the first guess vector.

2. The method of claim 1, wherein determining the first precoding vector comprises determining a first eigenvector of a channel covariance matrix and using the first eigenvector in the sender as the first precoding vector of the first signal layer.

3. The method of claim 1, wherein the method comprises determining the first guess vector by one of:
    determining a steering vector based on a determined angle of arrival of signals from the receiver; and
    determining a second eigenvector of a channel covariance matrix based on the long-term characteristics of the channel between the sender and the receiver.

4. The method of claim 1, wherein the grouping of antennas is based on the correlation between the antennas and wherein substantially correlated antennas are assigned to the same group.

5. The method of claim 4, wherein the grouping of antennas is based on at least one of:
    spacing between the antennas; and
    polarization configuration of the antennas.

6. The method of claim 1, wherein the method comprises determining the phase shift values of said groups of antennas to minimize an inner product of the first and second precoding vectors.

7. The method of claim 6, wherein the phase shift values are selected within a predefined set of phase shift values.

8. The method of claim 1, wherein the method comprises determining a component of the second precoding vector which is orthogonal to the first precoding vector and using the component as the second precoding vector of said second signal layer.

9. The method of claim 8, wherein the same phase shift value is used for all groups of antennas.

10. The method of claim 9, wherein the phase shift value is $e^{j\phi}=1$.

11. A computer program product embodied on a non-transitory computer-readable medium comprising computer code that, when being executed by a computer processor, is configured to provide instructions to at least control or carry out:
    determining a first precoding vector of a first signal layer based on partial channel state information of a channel between the sender and the receiver;
    determining a first guess vector based on long-term characteristics of the channel between the sender and the receiver;
    defining a grouping of antennas of the sender;
    specifying a phase shift value for each group of antennas; and
    determining a second precoding vector in the sender of a second signal layer by multiplying each element in the first guess vector with the phase shift value specified for the group of antennas associated with said element in the first guess vector.

12. An apparatus, for determining precoding information for beamforming between a sender and a receiver, comprising:
    at least one processor and at least one memory including computer program code, the at least one memory and the computer code being configured to, with the at least one processor, cause the apparatus to at least control or perform the following:
        determine a first precoding vector of a first signal layer based on partial channel state information for a channel between the sender and the receiver;
        determine a first guess vector based on long-term characteristics of the channel between the sender and the receiver;
        define a grouping of antennas of the sender;
        specify a phase shift value for each group of antennas; and
        determine a second precoding vector by multiplying each element in the first guess vector with the phase shift value specified for the group of antennas associated with said element in the first guess vector.

13. The apparatus of claim 12, wherein the at least one memory and the computer code, with the at least one processor are further configured to cause the apparatus to at least control or perform the following: determining the first precoding vector by determining a first eigenvector of a channel covariance matrix and using the first eigenvector in the sender as the first precoding vector of the first signal layer.

14. The apparatus of claim 12, wherein the at least one memory and the computer code, with the at least one processor are further configured to cause the apparatus to at least control or perform the following: determining the first guess vector by one of:
 determining a steering vector based on a determined angle of arrival of signals from the receiver; and
 determining a second eigenvector of a channel covariance matrix based on the long-term characteristics of the channel between the sender and the receiver.

15. The apparatus of claim 12, wherein the at least one memory and the computer code, with the at least one processor are further configured to cause the apparatus to at least control or perform the following: grouping the antennas based on the correlation between the antennas and wherein substantially correlated antennas are assigned to the same group.

16. The apparatus of claim 15, wherein the at least one memory and the computer code, with the at least one processor are further configured to cause the apparatus to at least control or perform the following: grouping the antennas based on at least one of:
 spacing between the antennas; and
 polarization configuration of the antennas.

17. The apparatus of claim 12 wherein the at least one memory and the computer code, with the at least one processor are further configured to cause the apparatus to at least control or perform the following: determining the phase shift values of said groups of antennas to minimize an inner product of the first and second precoding vectors.

18. The apparatus of claim 17, wherein the at least one memory and the computer code, with the at least one processor are further configured to cause the apparatus to at least control or perform the following: determining the phase shift values within a predefined set of phase shift values.

19. The apparatus of claim 12, wherein the at least one memory and the computer code, with the at least one processor are further configured to cause the apparatus to at least control or perform the following:
 determining a component of the second precoding vector which is orthogonal to the first precoding vector; and
 providing the component to the sender as the second precoding vector of said second signal layer.

20. The apparatus of claim 19, wherein the at least one memory and the computer code, with the at least one processor are further configured to cause the apparatus to at least control or perform the following: using the same phase shift value for all groups of antennas.

21. The apparatus of claim 20, wherein the at least one memory and the computer code, with the at least one processor are further configured to cause the apparatus to at least control or perform the following: using the phase shift value $e^{j\phi}=1$.

* * * * *